3,331,855
DERIVATIVES OF RESERPINEDIOL AND
DESERPIDINEDIOL
Alfred Popelak, Mannheim, Gustav Lettenbauer, Lampertheim Hesse, Wolfgang Schaumann, Mannheim-Waldhof, and Annemarie Ribbentrop, Mannheim, Germany, assignors to C. F. Boehringer & Soehne G.m.b.H., Mannheim - Waldhof, Germany, a corporation of Germany
No Drawing. Filed June 5, 1964, Ser. No. 373,083
Claims priority, application Germany, June 7, 1963, B 72,205
8 Claims. (Cl. 260—240)

This invention relates to a series of new reserpinediol and deserpidinediol derivatives having utility as hypotensive and tranquilizing agents.

More specifically, the novel reserpinediol and deserpidinediol derivatives of this invention are represented by the following structure:

FORMULA I

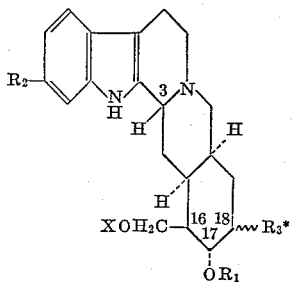

when:

$R_1$ represents lower alkyl,
$R_2$ represents hydrogen or lower alkoxy,
$R_3$ represents lower alkoxy, and
X represents hydrogen, acyl, alkyl, aralkyl or cycloalkyl and may also represent such group containing one or more oxygen atoms, and the salts thereof.

The term "salts" as used herein is intended to include all non-toxic or pharmacologically acceptable salts of the basic compounds, including both the acid addition salts and the quaternary ammonium salts.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide; phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

* ∿ indicates that $R_3$ may be above or below the plane of the drawing, i.e., the bond may be designated by a solid or dashed line.

The acid addition salts may be suitably prepared directly from the reaction mixture by acidifying with dilute acid such as hydrochloric acid. The alkyl halide quaternary salts are suitably prepared by treating the base in an anhydrous solvent medium with an excess of the alkyl halide and recrystallizing the product from ethanol.

The compounds of this invention are preferably prepared by a reaction between a compound represented by the following structure:

FORMULA II

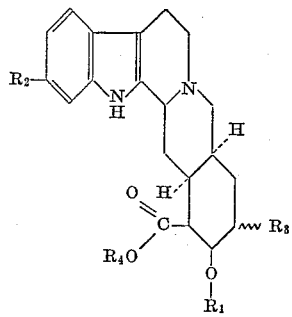

wherein $R_1$, $R_2$, and $R_3$ have the above indicated meanings, and $R_4$ represents hydrogen or alkyl and a reducing agent and the alcohol corresponding to Formula I (X=hydrogen) thus obtained is suitably esterified or etherified by a conventional method. The above defined bases may be converted into their pharmaceutically acceptable salts by the conventional methods.

The reduction of the compounds of Formula II is preferably carried out using complex metal hydrides as, for example, lithium aluminum hydride as reducing agent or, alternatively, the reduction may be effected employing sodium in alcohol as, for example, butanol according to the Bouveault-Blanc method.

The starting compounds for use in the process are well known and, for example, can be readily obtained by the process described in German "Auslegeschrift" 1,147,236.

The esterification of the product of Formula I (X=hydrogen) whereby the said compound is converted to the corresponding ester (X=acyl) can be carried out by the customary methods as, for example, by reaction of the Formula I compound with the corresponding aliphatic or aromatic carboxylic halide or anhydride in pyridine. A particularly advantageous method is acylating by means of N-acyl-imidazoles in the presence of an alkali hydride as, for instance, described in German patent application B 63,455, see also U.S. Patent No. 3,113,134.

The etherification of the compounds of Formula I can be effected by the known methods as, for example, by reaction of the starting compound with a diazoalkane in the presence of a catalyzing complex former as, for instance, an aluminum alcoholate or by alcoholysis of the sulfo acid esters, for instance, the tosylate, which can very easily be obtained from the carbinol. In those instances where X represents a cycloalkyl radical containing oxygen atoms, the etherification is preferably effected by reaction with either dihydropyran or dihydrofuran.

The following examples are drawn to illustrate novel compounds of this invention and will serve to illustrate the process for the preparation of the compounds, as well as the utility of certain new intermediate compounds (Example 1):

Example 1.—Reserpinediol-18-methyl ether (a) 10 grams methylreserpate-18-methyl ether (M.P. 238° C.) were reduced with 3 grams lithium aluminum hydride in the form of its suspension in 250 ml. absolute tetrahydrofuran as follows: The methyl-reserpate-18-methylether was added dropwise to the lithium aluminum hydride suspension with agitation. Following stirring for one hour at room temperature, the excess lithium aluminum hydride was decomposed by slowly adding a concentrated solution of ammonium sulfate under ice cooling. The precipitated aluminum hydroxide was separated by suction filtering. The precipitated aluminum hydroxide was washed with a mixture of methylene chloride and 10% methanol and the filtrate and wash solution combined and dried under vacuum. The residue thereby obtained was recrystallized from an isopropanol-methylene chloride mixture. 9.3 g. of a crystalline product was recovered melting at 242° C.

$[\alpha]_D^{20} = -46.2 \pm 0.6$ (c.=1 in chloroform)

$C_{23}H_{32}N_2O_4$ (400.5). Calc.: C, 68.97; H, 8.05; N, 7.00%. Found: C, 69.10; H, 7.78; N, 7.11%.

The hydrochloride of the base was prepared in the conventional manner and had a melting point of 216° C. The corresponding tartrate melted at 233° C. and the maleinate at 296° C.

(b) 2.1 grams methyl reserpate-18-methyl ether were dissolved in 30 ml. abs. butanol. 1.3 g. sodium were added to the resulting solution and the mixture was heated at 110° C. until the sodium had gone into solution. After cooling, 100 ml. benzene were added, and the solution extracted repeatedly by shaking with water. After drying the solution over sodium sulfate, the benzene was removed by vacuum distillation, and the residue (1.8 g.) was recrystallized from an isopropanol-methylene chloride mixture. The crystalline product which was obtained melted at 240° C. and was identical to the product obtained in Example 1a.

Example 2.—18-epi-reserpinediol-18-methyl ether

The method set out in Example 1 was followed and 10 grams 18-epi-methylreserpate-18-methyl ether (M.P. 238° C.) were converted to 8.2 g. 18-epi-reserpinediol-18-methyl ether. This compound was recrystallized from a mixture of alcohol and methylene chloride and had a melting point of 293° C.

$[\alpha]_D^{20} = -133.1 \pm 0.3$ (c.=1 in chloroform)

$C_{23}H_{32}N_2O_4$ (400.5). Calc.: C, 68.98; H, 8.05; N, 6.99%. Found: C, 68.93; H, 8.29; N, 6.89%.

Example 3.—O-acetyl-reserpinediol-18-methylether 2 grams reserpinediol-18-methylether prepared as in Example 1 were reacted with 0.85 g. of N-acetyl-imidazole in the form of its solution in abs. dimethylformamide following chilling to 5° C., and 0.15 g. sodium hydride were then added. After about one hour 100 ml. benzene were added and the resulting solution repeatedly washed with water. The washed benzene solution was dried over sodium sulfate and concentrated under vacuum. The base was recrystallized from a mixture of isopropanol and methylene chloride and had a melting point of 173° C. The yield of base amounted to 1.9 g.

$[\alpha]_D^{24} = +47.9 \pm 0.3$ (c.=1 in chloroform)

$C_{25}H_{34}N_2O_5$ (442.5). Calc.: C, 67.85; H, 7.74; N, 6.33%. Found: C, 67.94; H, 7.86; N, 6.39%.

Example 4.—O-3,4,5-trimethoxybenzoyl-reserpinediol-18-methylether (a) The above compound was obtained in a manner analogous to that of Example 3 from 1.5 g. reserpinediol-18-methylether and 1.5 g. N-3,4,5-trimethoxybenzoyl-imidazole under addition of 90 mg. sodium hydride and had a melting point of 163° C. after recrystallization from isopropanol. The yield of compound was 1.95 g.

$[\alpha]_D^{24} = -20.3 \pm 0.3$ (c.=1 in chloroform)

$C_{33}H_{42}N_2O_8$ (594.7). Calc.: C, 66.64; H, 7.12; N, 4.71%. Found: C, 66.87; H, 6.72; N, 5.19%.

(b) 1.5 g. reserpinediol-18-methylether and 2.5 g. trimethoxybenzoyl chloride were dissolved with cooling in 10 ml. of pyridine and 20 ml. ethylene chloride, and the solution allowed to stand in the refrigerator for 12 hours. For processing, 30 ml. ethylene chloride were added and the washing was carried out repeatedly with a 2 N solution of sodium bicarbonate. Thereafter the ethylene chloride solution was dried over sodium sulfate and desiccated in vacuo. The residue recovered was dissolved in benzene and purified chromatographically in a column containing 40 g. aluminum oxide. On recrystallizing from isopropanol, about 1.2 grams of crystals were obtained having a melting point of 163° C. and were identical to the compound obtained as in Example 4(a).

Example 5.—O-3,4,5-trimethoxycinnamoyl-reserpinediol-18-methylether 2 g. reserpinediol-18-methylether were reacted with 2.2 g. N-3,4,5-trimethoxycinnamoyl-imidazole and 120 mg. sodium hydride, in a manner analogous to that of Example 3, to produce 2.75 g. O-3,4,5-trimethoxycinnamoyl-reserpinediol-18-methylether. After recrystallization from isopropanol, the compound melted at 188° C.

$[\alpha]_D^{24} = -11.7 \pm 0.3$ (c.=1 in chloroform)

$C_{35}H_{44}N_2O_8$ (620.7). Calc.: C, 67.73; H, 7.14; N, 4.52%. Found: C, 67.59; H, 6.80; N, 4.83%.

Example 6.—O-propionyl-reserpinediol-18-methylether

O-propionyl-reserpinediol-18-methylether was made from reserpinediol-18-methylether and N-propionyl-imidazole in a manner analogous to that set out in Example 3. Colorless crystals were thereby obtained in an about 80% yield. The crystals melted at 146° C. following recrystallization from diisopropyl ether.

$[\alpha]_D^{24} = +35.5 \pm 1$ (c.=1 in chloroform)

$C_{26}H_{36}N_2O_5$ (456.6). Calc.: C, 68.39; H, 7.95; N, 6.13%. Found: C, 68.29; H, 7.97; N, 6.13%.

Example 7.—O-acetyl-18-epi-reserpinediol-18-methylether

The above compound was obtained by a procedure analogous to that described in Example 3 from 18-epi-reserpinediol-18-methylether and N-acetyl-imidazole. The O-acetyl-18-epi-reserpinediol-18-methylether crystallized from isopropanol in the form of colorless needles, which melted at 213° C.

$C_{25}H_{34}N_2O_5$ (442.5). Calc.: C, 67.85; H, 7.74; N, 6.33%. Found: C, 67.65; H, 7.62; N, 6.21%.

Example 8.—Reserpinediol-dimethylether 5 g. reserpinediol-18-methylether (see Example 1) were dissolved in 300 ml. methylene chloride and, after the addition of 2 g. aluminum isopropylate, a solution of diazomethane in methylene chloride was added in excess. The resulting mixture was allowed to stand for 12 hours at room temperature. Thereafter the mixture was agitated with a solution of 4 g. tartaric acid in 50 ml. water and made alkaline with concentrated ammonia. The methylene chloride phase was separated and the aqueous solution remaining extracted repeatedly by shaking with methylene chloride. The methylene chloride phases were thereafter combined, dried over sodium sulfate and concentrated under vacuum. The residue of 4.55 g. gave after recrystallisation form acetic ester 3.7 g. crystals, which melted at 218–219° C.

$[\alpha]_D^{20} = -25.3 \pm 0.6$ (c.=1 in chloroform)

$C_{24}H_{34}N_2O_4$ (414.55). Calc.: C, 69.54; H, 8.27; N, 6.76%. Found: C, 69.86; H, 8.23; N, 6.97%.

The hydrochloride of this base melted at 245° C. after recrystallisation from isopropanol; the maleinate melted at 195° C.

*Example 9.—18-epi-reserpinediol-dimethylether*

2 g. 18-epi-reserpinediol-18-methylether (Example 2) were methylated as set out in Example 8. When recrystallized from an acetic ester-methylene chloride mixture, the base melted at 220–221° C. The yield amounted to 1.6 g.

$[\alpha]_D^{22} = +69.5 \pm 0.5$ (c.=1 in chloroform)

$C_{24}H_{34}N_2O_4$ (414.5). Calc.: C, 69.54; H, 8.27; N, 6.76%. Found: C, 69.57; H, 8.52; N, 6.67%.

*Example 10.—O-acetyl-deserpidinediol-18-methylether*

2 g. deserpidinediol-18-methylether having a melting point of 242–243° C.; $[\alpha]_D^{23} = -61.1 \pm 0.5$ in 1:1 chloroform:methanol; c.=1) were reacted with 1.5 g. acetylimidazole and 0.2 g. sodium hydride in 30 ml. of dimethyl formamide, by a procedure analgogous to that described in Example 3. The hydrochloride of the base, when recrystallized from isopropanol, melted at 256° C. The yield of O-acetyl-deserpidinediol-18-methylether amounted to about 1.8 g.

$[\alpha]_D^{25} = -12.1 \pm 0.5$ ($CH_3OH/CHCl_3$ 1:1; c.=1)

$C_{24}H_{32}N_2O_4 \cdot HCl$ (448.98). Calc.: C, 64.20; H, 7.41; N, 6.24; Cl, 7.90%. Found: C, 63.92; H, 7.54; N, 6.14; Cl, 7.89%.

*Example 11.—Deserpidinediol-dimethylether*

2.8 g. of deserpidinediol-18-methylether were methylated with diazomethane in the presence of 2.2 g. of aluminum isopropylate (as described in Example 8). The base thereby obtained was converted into the corresponding hydrochloride with ethereal hydrochloric acid solution. The salt, when recrystallized from isopropanol, melted at 234–235° C.

$[\alpha]_D^{24} = -47.8 \pm 0.5$ ($CH_3OH$; c.=1)

$C_{23}H_{32}N_2O_3 \cdot HCl$ (420.9). Calc.: C, 65.61; H, 7.90; N, 6.65; Cl, 8.42%. Found: C, 65.20; H, 7.95; N, 6.34; Cl, 8.40%.

*Example 12.—Deserpidinediol-18-methylether*

4 g. methyldeserpidate-18-methylether were dissolved in about 100 ml. tetrahydrofuran and added with stirring to a suspension of 2 g. lithium aluminum hydride in 50 ml. tetrahydrofuran. The mixture was thereafter refluxed for 1 hour and decomposed with a few ml. of water after cooling. The precipitated aluminum hydroxide was separated off by suction filtering and washed with methylene chloride. The combined filtrates were dried and the residue (about 4 g.) recrystallized from methanol-methylene chloride mixture. There were obtained in a yield of approximately 3 g. colorless crystals which melted at 242–243° C.

$[\alpha]_D^{23} = -61.1$ ($CH_3OH/CHCl_3$ 1:1, c.=1)

$C_{22}H_{30}N_2O_3 \cdot CH_3OH$ (402.54). Calculated: C, 68.62; H, 8.52; N, 6.79%. Found: C, 68.58; H, 8.45; N, 6.94%.

The compounds of the invention have particularly interesting pharmacological properties constituting particularly effective blood pressure reducing, sedative and tranquilizing agents. In order to establish the pharmacological activities of the new compounds and to better evaluate these activities as compared to a known compound, the following procedures were carried out using in that connection the compounds as hereinafter set out:

(1) reserpinediol-18-methyl ether
(2) 18-epi-reserpinediol-18-methyl ether
(3) O-acetyl-reserpinediol-18-methyl ether
(4) O-3,4,5-trimethoxybenzoyl-reserpinediol-18-methyl ether
(5) O - 3,4,5 - trimethoxycinnamoyl-reserpinediol-18-methyl ether
(6) O-propionyl-reserpinediol-18-methyl ether
(7) O-acetyl-18-epi-reserpinediol-18-methyl ether
(8) reserpinediol-dimethyl ether
(9) 18-epi-reserpinediol-dimethylether
(10) O-acetyl-deserpidinediol-18-methyl ether
(11) deserpidinediol-dimethylether
(12) reserpine-comparison compound (I) *Effect on the central nervous system (CNS)*

(a) The *sedative* effect was determined on the basis of the potentiation of thiopental narcosis in the mouse by Taeschler's method (J. Pharmacol. Exper. Ther. 120, 179, 1959). The $ED_{50}$ in mg. per kg. of body weight was determined 30 and 240 minutes after subcutaneous injection of the test compounds, in order to follow the course of the sedation obtained.

(b) The *tranquilizing effect* was evaluated on the basis of the inhibition of secondarily caused reactions (SCR) in the rat by the procedure of Maffii (J. Pharm. Pharmacol. 11, 129, 1959). Three to four groups of 10 rats each were tested 4 to 6 hrs. after subcutaneous injection of various doses of the test compounds, each group being tested 5 times. The $ED_{50}$ in mg. per kg. of body weight, which is set out in Table I was determined from the percentage of inhibition at the various dosages.

The object and purpose of the tests were to be able to specify the *working character* of the tested compounds as a selective tranquilization. The lower the quotient obtained by dividing the $ED_{50}$ of the SCR inhibition by the $ED_{50}$ of the thiopental narcosis, the closer one approaches these aims.

(II) *Blood pressure reduction*

(a) *In rabbits under urethane narcosis.*—The blood pressure was measured at a femoral artery. Both of the depressor nerves were severed. At intervals of 5 minutes, both of the carotid arteries were clamped shut for 30 seconds. Three such carotid sinus unloading reflexes were carried out before the intravenous injection of 0.5 mg. per kg., of the compounds being tested, three more being carried out 60 to 90 minutes thereafter. Preliminary experiments have shown that the effect has completely developed by this time.

In each individual experiment, the normal blood pressure and the increase in pressure during release before administration of the compound being tested were taken as equal to 100, and the decrease in these pressures after 60 to 90 minutes was calculated as a percentage.

(b) *In hypertonic rats.*—The hypertonia was produced in some of the animals by operative removal of one kidney with simultaneous encapsulation of the other. In other animals it was produced by repeated injection of DOCA and the addition of sodium chloride to the food. The blood pressure was measured under ether anaesthesia. An inflatable rubber cuff was applied to the root of the tail, and the pulsations at the tip of the tail were recorded with the pulsometer as described by Brecht and Boucke (Arch. Exper. Path. u. Pharmakol. 217, 399, 1953). The pressure was measured at which the first pulsations occurred. The table gives the decrease of blood pressure in mm. of mercury 2 hours after s.c. injection of 2 mg. per kg. At least 10 animals were used in each group.

The results of the procedures are set out in the following table:

TABLE I

| Substance | Thiopental-Narcosis | | Inhibition of Secondarily Caused Reactions (SCR) | $ED_{50}$ SCR/ $ED_{50}$ Thiopental-Narcosis | Rabbit Decrease | | Rat Blood Pressure Reduction |
|---|---|---|---|---|---|---|---|
| | 30 min. | 240 min. | | | Blood Pressure | CSU [1] | |
| 12 | 7.0 | 0.1 | 0.8 | 8 | 31 | 68 | 38 |
| 1 | | | | | 17 | 34 | |
| 2 | >40 | >40 | >20 (30%) | | 17 | 39 | 53 |
| 3 | 7.8 | 1.7 | 0.34 | 0.2 | 11 | 12 | 39 |
| 4 | >40 | >40 | >20 | | 22 | 30 | 36 |
| 5 | >40 | >40 | >20 | | 16 | 42 | |
| 8 | 1.48 | 1.25 | 0.8 | 0.6 | 10 | 44 | |
| 9 | 4.85 | 4.75 | 1.62 | 0.3 | 37 | 59 | 33 |
| 6 | 13.4 | >40 (20%) | 2.6 | 0.2 | | | |
| 7 | 5.3 | >20 (40%) | 1.28 | 0.2 | | | |
| 10 | >20 | >40 | 4.8 | <0.2 | | | |
| 11 | ≥10 | >10 | 2.45 | 0.3 | | | |

[1] Carotid sinus unloading reflex.

*With reference to effect on the central nervous system.*—From the table, the superiority over reserpine can be shown on the basis of the following findings:

(a) O-acetyl-reserpinediol-18-methyl ether inhibited secondarily caused reactions in the rat in substantially smaller doses than did reserpine.

(b) On the basis of a specific tranquilizing effect. In this regard, both O-acetyl-reserpinediol-18-methyl ether and reserpinediol dimethyl ether, 18-epi-reserpinediol-dimethyl ether, O-propionyl-reserpinediol-18-methyl ether, O-acetyl-18-epi-reserpinediol-18-methyl ether, O-acetyl-deserpidinediol-18-methyl ether, and deserpidinediol-dimethyl ether are superior to the reserpine standard.

(c) Reserpine is characterized by the fact that its effect sets in very slowly. The $ED_{50}$ in the thiopental test amounted after 30 minutes to 7.0, and after 240 minutes to 0.1 mg. per kg. In comparison, the $ED_{50}$ of O-acetyl-reserpinediol-18-methyl ether after 30 minutes was only about 5 times higher than after 240 minutes. In the case of reserpinediol-dimethyl ether and 18-epi-reserpinediol-dimethyl ether, the $ED_{50}$ at both times was identical, which indicates a substantially faster onset of effect. In the case of O-propionyl-reserpinediol-18-methyl ether and O-acetyl-18-epi-reserpinediol-18-methyl ether, short-working compounds are involved, their effect having ceased after 4 hours.

A more rapid onset and a shorter duration of effect are advantageous, since the protracted effect of reserpine makes the control of the dose more difficult.

*With reference to blood pressure reduction.*—The superiority over reserpine is due:

(a) To a greater reduction of blood pressure, though experience has established that rauwolfia alkaloids which reduce blood pressure do not widely differ in their effectiveness.

(b) To an antihypertensive action nearly equal to reserpine in the absence of sedation. In this regard, 18-epi-reserpinediol-18-methyl ether, O-3,4,5-trimethoxybenzoyl-reserpinediol-18-methyl ether and O-3,4,5-trimethoxycinnamoyl-reserpinediol-18-methyl ether are superior to reserpine.

The compositions of the invention are put up in any suitable dosage form such as tablets or the common powder mix papers, or capsules, for oral administration. They can also be administered intravenously and intramuscularly. For parenteral use or in the capsules or tablets, the composition need only consist of the selected reserpinediol or deserpidinediol of the type described herein as having a hypotensive or sedative effect. In the case of the tablet there is included a suitable binder compatible with the principal ingredient and non-toxic when taken in the amount and frequency resulting from the administration regimen of the preparation. In the case of the injectible, the compound is administered in the form of its solution or suspension in water or other aqueous menstruum, i.e., aqueous suspending medium, or in any of the commonly used oil menstruums, i.e., oil suspending medium, or in any of the commonly used oil menstruums, i.e., oil suspending media.

We claim:

1. A compound selected from the group consisting of a compound of the formula:

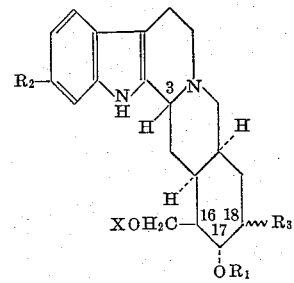

wherein $R_1$ is lower alkyl, $R_2$ is a member selected from the group consisting of hydrogen and lower alkoxy, $R_3$ is lower alkoxy and X is a member selected from the group consisting of hydrogen, lower alkyl, lower alkanoyl, trimethoxy benzoyl and trimethoxy cinnamoyl and a pharmaceutically acceptable non-toxic acid addition and quaternary ammonium salt thereof.

2. O-acetyl-reserpinediol-18-methyl-ether.
3. O-acetyl-18-epi-reserpinediol-18-methyl-ether.
4. Reserpinediol-dimethylether.
5. O-3.4,5-trimethoxybenzoyl-reserpinediol-18-methyl-ether.
6. O-3,4,5-trimethoxycinnamoyl-reserpinediol-18-methylether.
7. 18-epi-reserpinediol-18-methylether.
8. O-propionyl-reserpinediol-18-methylether.

No references cited.

WALTER A. MODANCE, *Primary Examiner.*

JULIAN S. LEVITT, *Examiner.*

JAMES A. PATTEN, LEROY B. RANDALL,
*Assistant Examiners.*